United States Patent [19]

Olander, Jr. et al.

[11] 4,028,538
[45] June 7, 1977

[54] PROGRAMMABLE CALCULATOR EMPLOYING ALGEBRAIC LANGUAGE

[75] Inventors: Emil Edward Olander, Jr., Fort Collins; Rex L. James, Loveland; Ivar W. Larson, Loveland; Wayne F. Covington, Loveland; Jack M. Walden, Loveland; Robert E. Watson, Loveland; Francis J. Yockey, Loveland; Fred Wenninger, Jr., Loveland; Homer C. Russell, Berthoud, all of Colo.

[73] Assignee: Hewlett-Packard Company, Palo Alto, Calif.

[22] Filed: Sept. 30, 1974

[21] Appl. No.: 510,921

Related U.S. Application Data

[62] Division of Ser. No. 212,581, Dec. 27, 1971, Pat. No. 3,839,630.

[52] U.S. Cl. .............................. 235/156; 340/172.5
[51] Int. Cl.² ...................... G06F 7/38; G06F 15/02
[58] Field of Search .......... 235/156, 159, 160, 164; 340/172.5

[56] References Cited

UNITED STATES PATENTS

| 3,315,234 | 4/1967  | Ruth .................. | 340/172.5 |
| 3,346,853 | 10/1967 | Koster et al. ......... | 340/172.5 |
| 3,389,404 | 6/1968  | Koster ................ | 340/172.5 |
| 3,405,392 | 10/1968 | Milne et al. .......... | 340/172.5 |
| 3,428,950 | 2/1969  | Chung et al. ......... | 340/172.5 |
| 3,588,841 | 6/1971  | Ragen ................ | 340/172.5 |
| 3,720,820 | 3/1973  | Cochran .............. | 235/156   |
| 3,760,171 | 9/1973  | Wang et al. .......... | 235/156   |

*Primary Examiner* — David H. Malzahn
*Attorney, Agent, or Firm* — Roland I. Griffin; William E. Hein

[57] ABSTRACT

An adaptable programmable calculator is provided by employing a modular read-write and read-only memory unit capable of being expanded to provide the calculator with additional program and data storage functions oriented towards the environment of the user, a central processing unit capable of performing both serial binary and parallel binary-coded-decimal arithmetic, and an input-output control unit capable of bidirectionally transferring information between the memory or central processing units and a number of input and output units. The memory, central processor, and input-output control units are controlled by a microprocessor included in the central processing unit. A keyboard input unit with a plurality of sections capable of being defined by plug-in read-only memory modules and stored programs added by the user, a magnetic card reading and recording unit, a solid state output display unit, and an output printer unit are included among the input and output units. The calculator employs a high level algebraic keyboard language permitting the user to enter a line of one or more alphameric statements into the calculator from the keyboard input unit while visually observing an alphameric display of the line being entered to check for errors therein, permitting the user to cause the entered lines to be immediately executed by the calculator and/or stored as part of a program within the memory unit, and permitting the user to subsequently recall the executed and/or stored line, so that it may be reinspected, reevaluated and if necessary, edited and executed or reexecuted. The calculator also employs a compiler for converting each line entered into the calculator in the high level keyboard language into a past-fix polish code and an uncompiler for regenerating in the high-level keyboard language any entered line converted to the post-fix polish code. Both the compiler and the uncompiler operate on a line-by-line basis.

20 Claims, 4 Drawing Figures

PROGRAMMABLE CALCULATOR EMPLOYING ALGEBRAIC LANGUAGE

CROSS REFERENCE TO RELATED APPLICATION

This is a division of application Ser. No. 212,581, filed Dec. 27, 1971, now issued as U.S. Pat. No. 3,839,630 and incorporated herein by reference.

BACKGROUND OF THE INVENTION

This invention relates generally to calculators and improvements therein and more particularly to programmable calculators that may be controlled both manually from the keyboard input unit and automatically by a stored program loaded into the calculator from the keyboard input unit or an external record member.

Computational problems may be solved manually, with the aid of a calculator (a dedicated computational keyboard-driven machine that may be either programmable or nonprogrammable), or a general purpose computer. Manual solution of computational problems is often very slow, so slow in many cases as to be an impractical, expensive, and ineffective use of the human resource, particularly when there are other alternatives for solution of the computational problems.

Nonprogrammable calculators may be employed to solve many relatively simple computational problems more efficiently than they could be solved by manual methods. However, the keyboard operations or language employed by these calculators is typically trivial in structure, thereby requiring many keyboard operations to solve more general arithmetic problems. Programmable calculators may be employed to solve many additional computational problems at rates hundreds of times faster than manual methods. However, the keyboard language employed by these calculators is also typically relatively simple in structure, thereby again requiring many keyboard operations to solve more general arithmetic problems.

Another basic problem with nearly all of the keyboard languages employed by conventional programmable and nonprogrammable calculators is that they allow the characteristics of the hardware of the calculator to show through to the user. Thus, the user must generally work with data movement at the hardware level, for example, by making sure that data is in certain storage registers before specifying the operations to be performed with that data and by performing other such "housekeeping" functions.

In the past both programmable and nonprogrammable calculators have generally had very limited memories thereby severely limiting the size of the computational problems they could be employed to solve. Because of these limitations, the relatively simple structure of the keyboard languages employed by these calculators and the "housekeeping" requirements associated with their languages have not heretofore been serious shortcomings. However, with advances in technology the cost of memories has decreased to a point where larger memories could be economically included in programmable calculators. These larger memories have allowed larger and larger problems to be handled by programmable calculators. As a result the shortcomings of conventional calculator languages have become more critical thereby creating the need for higher level keyboard languages.

In addition to the foregoing shortcomings, conventional programmable calculators generally have less capability and flexibility than is required to meet the needs of many users. For example, they typically cannot be readily expanded and adapted by the user to increase the amount of program and data storage memory or to perform many special keyboard functions oriented toward the environment of the user.

In some conventional programmable calculators a program stored within the calculator can be recorded onto an external magnetic record member and can later be reloaded back into the calculator from the magnetic record member. However, data and programs stored within these calculators typically cannot be separately recorded onto an external magnetic record member and later separately reloaded back into the calculator therefrom. Moreover, these calculators typically have no provision for making a program secure when it is recorded onto an external magnetic record member. Any user may therefore re-record the program or obtain an indication of the individual program steps once the program is reloaded into the calculator.

Conventional programmable calculators with self-contained output display units typically have little or no alpha capability and typically can only display the contents of one or more selected registers. They are therefore typically unable to display a line of one or more alphameric statements or an alphabetic message such as might be used, for example, to inform the user how to run programs with which he may be unfamiliar. Such features would be very helpful to the user both in editing programs and in simplifying their use.

Similarly, conventional programmable calculators with self-contained output printer units typically have a very limited alpha capability of only a few selected characters confined to certain columns of the printer. They are therefore typically unable to print out a distinct mnemonic representation of every program step of every program stored within the calculator. Furthermore, they are typically unable to print out labels for inputs to and outputs from the calculator or messages informing the user how to run programs with which he may be unfamiliar. Such features would also be very helpful to the user both in editing programs and in simplifying their use.

In order to efficiently employ a programmable calculator to solve many non-trivial computational problems, the user must be given operator instructions that, when followed, will provide a printed listing of computed results. Since conventional calculators typically do not include both a self-contained volatile output display unit and a self-contained output printer unit, each of which has an alpha capability, the operator instructions are presented either as numbers on the volatile output display unit or as alphameric messages scattered within the printed listing of computed results. The presentation of operator instructions as numbers by the volatile output display unit is undesirable because the user must then either memorize or look up the operator instructions corresponding to the numbers displayed. Similarly, the presentation of operator instructions scattered throughout the printed listing of computed results is also undesirable.

Conventional programmable calculators typically have little or no capability for editing keyboard entries or programs stored within the calculator. For example, they typically have no provision for deleting, replacing, and inserting information included in or omitted from a keyboard entry or internally-stored program on a character-by-character or line-by-line basis. As another example, they typically have no provision for directly recalling any line of an internally-stored program of one or more lines of alphameric statements. Such features would be very helpful to the user in editing programs.

Conventional computers typically have or may be programmed to have much more capability than conventional programmable calculators. For many computational problems the computer provides little or no economical improvement over manual methods of solution because of the difficulty of the interfacing problem between the user and the machine. This interfacing problem appears as a slow turn around time in batch processing or in a long learning period for the user due to the general-purpose nature of the computer. A skilled programmer is typically required to utilize a computer. Due to these factors, conventional computers are best suited for handling large amounts of data or solving highly iterative or very complex computational problems.

SUMMARY OF THE INVENTION

The principal object of this invention is to provide an improved programmable calculator that has more capability and flexibility than conventional programmable calculators, that is smaller, less expensive and more efficient in calculating elementary mathematical functions than conventional computer systems, and that is easier to utilize than conventional programmable calculators or computer systems.

Another object of this invention is to provide a programmable calculator employing a directly usable high-level keyboard language that completely eliminates most of the operator housekeeping requirements typically associated with the languages of conventional programmable calculators and computers.

Another object of this invention is to provide a programmable calculator in which programs stored within the calculator may be edited more efficiently than in conventional programmable calculators.

Another object of this invention is to provide a programmable calculator in which the user may enter a line of one or more alphameric statements into the calculator from a keyboard, may visually observe an alphameric display of part or all of the line both while it is being entered and after it has been entered to check for errors therein, and upon determining that the entered line is error free may selectively cause it to be immediately executed by the calculator and/or stored as a program or a portion of a program within the calculator.

Another object of this invention is to provide a programmable calculator in which the user may selectively and nondestructively recall any line of one or more alphameric statements stored as a program or a portion of a program within the calculator and may visually observe an alphameric display of any part or all of the recalled line to check for errors therein.

Another object of this invention is to provide a programmable calculator in which the user may selectively and nondestructively recall any line of one or more alphameric statements stored within a program memory of the calculator, may visually observe an alphameric display of any part or all of the recalled line to check for errors therein, may edit the recalled line without altering the program stored within the program memory, and may thereafter store the edited recalled line in the program memory in place of the corresponding unedited line stored therein.

Another object of this invention is to provide a programmable calculator in which the user may employ a forward key and a back key of a keyboard to single step either forward or backward through a line of one or more alphameric statements entered into the calculator from the keyboard or recalled from a program stored within the calculator and may visually observe an alphameric display of part or all of the entered or recalled line up to and including as the last character of the display the last character to which the calculator has been single stepped.

Another object of this invention is to provide a programmable calculator in which the user may employ a forward key and a back key of a keyboard to single step either forward or backward through a line of one or more alphameric statements recalled from a program stored within the calculator and upon reaching either the back or the front end of the recalled line to automatically recall the next succeeding or preceeding line, respectively, of the program.

Another object of this invention is to provide a programmable calculator in which the user may visually observe any part or all of a line of one or more alphameric characters entered into the calculator from a keyboard or recalled from a program stored within the calculator and may either selectively delete or replace incorrect or undesired portions of the observed line or selectively insert corrected or previously omitted portions of the observed line from the keyboard on a character-by-character or line-by-line basis.

Another object of this invention is to provide a programmable calculator in which the user may sequentially depress a recall key of a keyboard to step line-by-line through a plurality of lines of alphameric statements stored as a program or a portion of a program within the calculator unit, and a central processing unit to provide an adaptable programmable calculator having manual operating, automatic operating, program entering, magnetic card reading, magnetic card recording, and alphameric printing modes. The keyboard input unit includes a group of data keys for entering numeric data into the calculator, a group of control keys for controlling the various modes and operations of the calculator and the format of the output display, and a group of definable keys for controlling additional functions that may be added by the user. All of the data keys and nearly all of the control keys may also be employed for programming the calculator, many of the control keys being provided solely for this purpose.

The magnetic card reading and recording unit includes a reading and recording head, a drive mechanism for driving a magnetic card from an input receptacle in the front panel of the calculator housing past the reading and recording head to an output receptacle in the front panel, and reading and recording drive circuits coupled to the reading and recording head for bidirectionally transferring information between the magnetic card and the calculator as determined by the control keys of the keyboard input unit. It also includes a pair of detectors and an associated control circuit for disabling the recording drive circuit whenever a notch is detected in the leading edge of the magnetic card to prevent information recorded on the magnetic card from being inadvertently destroyed. Such a notch may be provided in any magnetic card the user desires to protect by simply pushing out a perforated portion thereof.

The output printer unit includes a stationary thermal printing head with a row of resistive heating elements, a drive circuit for selectively energizing each heating element, and a stepping mechanism for driving a strip of thermally sensitive recording paper past the stationary thermal printing head in seven steps for each line of alphameric information to be printed out. Every alphabetic and numeric character and many other symbols may be printed out individually or in messages as determined by the control keys of the keyboard input unit or by a program stored within the calculator.

The input-output control unit includes a sixteen-bit universal shift register serving as an input-output register into which information may be transferred serially from the central processing unit or in parallel from the keyboard input and magnetic card reading and recording units and from which information may be transferred serially to the central processing unit or in parallel to the solid state output display, magnetic card reading and recording, and output printer units. It also includes control logic responsive to the central processing unit for controlling the transfer of information between these units. The input-output control unit may also be employed to perform the same functions between the central processing unit and peripheral units including, for example, a digitizer, a marked card reader, an X-Y plotter, a magnetic tape unit, a disc, and a typewriter. A plurality of peripheral units may be connected at the same time to the input-output control unit by simply plugging interface modules associated with the selected peripheral units into receptacles provided therefore in a rear panel of the calculator housing.

The memory unit includes a modular random-access read-write memory having a dedicated system area and a separate user area for storing program steps and/or data. The user portion of the read-write memory may be expanded without increasing the overall dimensions of the calculator by the addition of a program storage module. Additional read-write memory made available to the user is automatically accommodated by the calculator, and the user is automatically informed when the storage capacity of the read-write memory has been exceeded.

The memory unit also includes a modular read-only memory in which routines and subroutines of basic instructions for performing the various functions of the calculator are stored. These routines and subroutines of the read-only memory may be expanded and adapted by the user to perform additional functions oriented toward the specific needs of the user. This is accomplished by simply plugging additional read-only memory modules into receptacles provided therefor in the top panel of the calculator housing. Added read-only memory modules are automatically accommodated by the calculator and may be associated with the definable keys of the keyboard input unit or employed to expand the operations associated with other keys. An overlay is employed with each added read-only memory module associated with the definable keys of the keyboard input unit to identify the additional functions that may then be performed by the calculator.

Plug-in read-only memory modules include, for example, a trigonometric module, a peripheral control module, and a definable functions module. The trigonometric module enables the calculator to perform trigonometric functions, logarithmic functions, and many other mathematical functions. The definable functions module enables the user to store subprograms of his own choosing in the program storage section of the read-write memory, associate them with some of the definable keys of the keyboard input unit, and protect them from subsequently being inadvertently altered or destroyed. These subprograms may have their own line numbering sequence and may be any of three types: an immediate execute type wherein the subprogram may be run upon depressing a DEFINE key; a subroutine utilizing parameters; a function having parameters that may be employed as any other keyboard function.

The memory unit further includes a pair of recirculating sixteen-bit serial shift registers. One of these registers serves as a memory address register for serially receiving information from an arithmetic-logic unit included in the central processing unit, for parallel addressing any memory location designated by the received information, and for serially transferring the received information back to the arithmetic-logic unit. The other of these registers serves as a memory access register for serially receiving information from the arithmetic-logic unit, for writing information in parallel into any addressed memory location, for reading information in parallel from any addressed memory location, and for serially transferring information to the arithmetic logic unit. It also serves as a four-bit parallel shift register for transferring four bits of binary-coded-decimal information in parallel to the arithmetic-logic unit.

The central processing unit includes four recirculating sixteen-bit serial shift registers, a four-bit serial shift register, the arithmetic logic unit, a programmable clock, and a microprocessor. Two of these sixteen-bit serial shift registers serve as accumulator registers for serially receiving information from and serially transferring information to the arithmetic logic unit. The accumulator register employed is designated by a control flip-flop. One of the accumulator registers also serves as a four-bit parallel shift register for receiving four bits of binary-coded-decimal information in parallel from and transferring four bits of such information in parallel to the arithmetic logic unit. The two remaining sixteen-bit serial shift registers serve as a program counter register and a qualifier register, respectively. They are also employed for serially receiving information from and serially transferring information to the arithmetic-logic unit. The four-bit serial shift register serves as an extend register for serially receiving information from either the memory access register or the arithmetic-logic unit and for serially transferring information to the arithmetic-logic unit.

The arithmetic-logic unit is employed for performing one-bit serial binary arithmetic, four-bit parallel binary-coded-decimal arithmetic, and logic operations. It may also be controlled by the microprocessor to perform bidirectional direct and indirect arithmetic between any of a plurality of the working registers and any of the storage registers of the data storage section of the read-write memory.

The programmable clock is employed to supply a variable number of shift clock pulses to the arithmetic logic unit and to the serial shift registers of the input-output, memory, and central processing units. It is also employed to supply clock control signals to the input-output control logic and to the microprocessor.

The microprocessor includes a read-only memory in which a plurality of microinstructions and codes are stored. These microinstructions and codes are employed to perform the basic instructions of the calculator. They include a plurality of coded and non-coded microinstructions for transferring control to the input-output control logic, for controlling the addressing and accessing of the memory unit, and for controlling the operation of the two accumulator registers, the program counter register, the extend register and the arithmetic logic unit. They also include a plurality of clock codes for controlling the operation of the programmable clock, a plurality of qualifier selection codes for selecting qualifiers and serving as primary address codes for addressing the read-only memory of the microprocessor, and a plurality of secondary address codes for addressing the read-only memory of the microprocessor. In response to a control signal from a power supply provided for the calculator, control signals for the programmable clock, and qualifier control signals from the central processing and input-output control units, the microprocessor issues the microinstructions and codes stored in the read-only memory of the microprocessor as required to process either binary or binary-coded-decimal information entered into or stored in the calculator.

DESCRIPTION OF THE DRAWINGS

The following figures have been numbered in correspondence with the same figures of U.S. Pat. No. 3,839,630, cited above as being incorporated herein by reference.

FIGS. 2A-B are a simplified block diagram of the adaptable programmable calculator of FIG. 1.

DESCRIPTION OF THE PREFERRED EMBODIMENT

GENERAL DESCRIPTION

Figure 1:
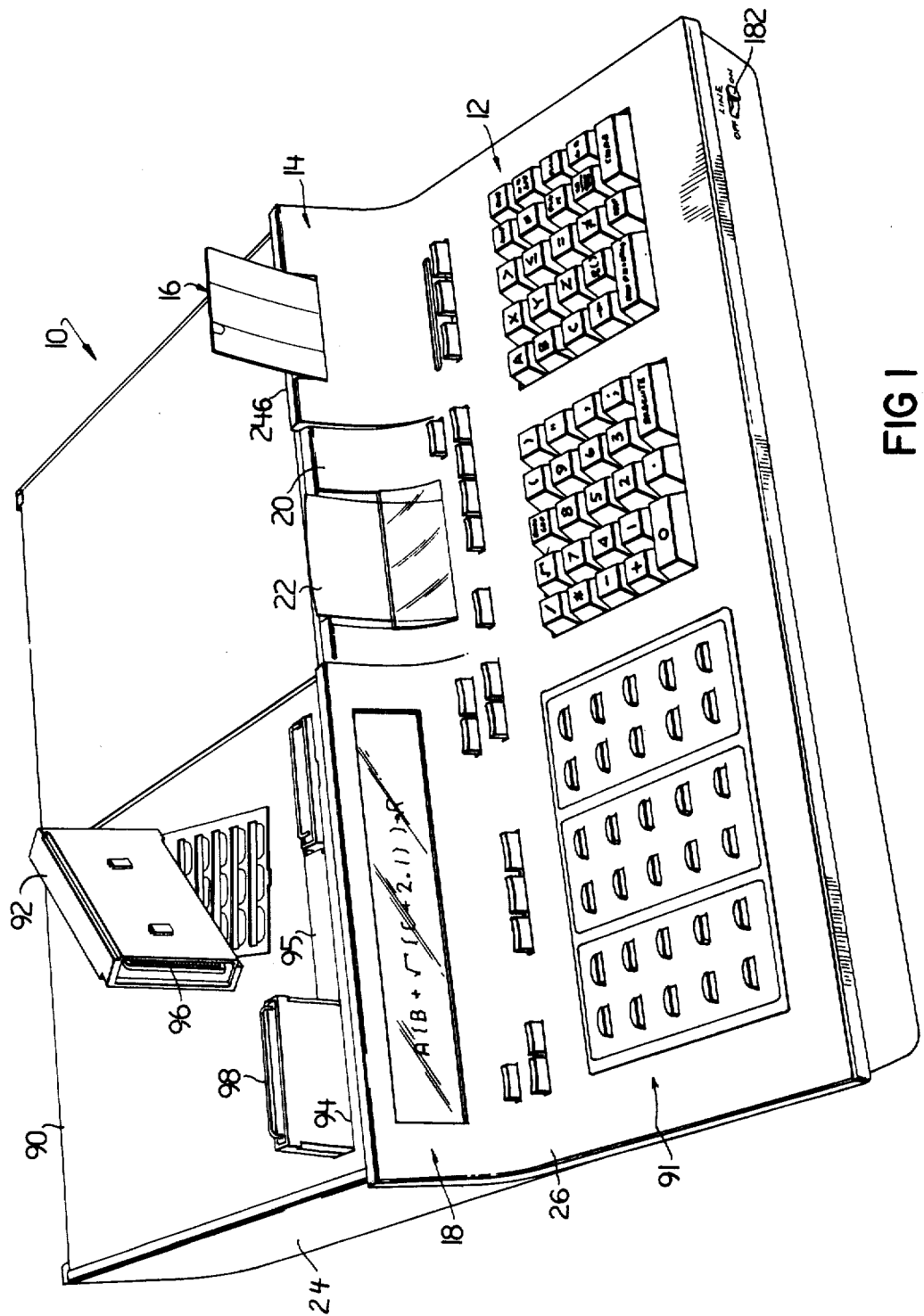
FIG. 1 is a front perspective view of an adaptable programmable calculator according to the preferred embodiment of this invention.

Referring to FIG. 1, there is shown an adaptable programmable calculator 10 including both a keyboard input unit 12 for entering information into and controlling the operation of the calculator and a magnetic card reading and recording unit 14 for recording information stored within the calculator onto one or more external magnetic cards 16 and for subsequently loading the information recorded on these and other similar magnetic cards back into the calculator. The calculator also includes a solid state output display unit 18 for displaying alphameric information stored within the calculator. It may also include an output printer unit 20 for printing out alphameric information on a strip of thermally sensitive recording paper 22. All of these input and output units are mounted within a single calculator housing 24 adjacent to a curved front panel 26 thereof.

Referring to the simplified block diagram shown in FIGS. 3A-B, it may be seen that the calculator also includes an input-output control unit 44 (hereinafter referred to as the I/O control unit) for controlling the transfer of information to and from the input and output units, a memory unit 46 for storing and manipulating information entered into the calculator and for storing routines and subroutines of basic instructions performed by the calculator, and a central processing unit 48 (hereinafter referred to as the CPU) for controlling the execution of the routines and subroutines of basic instructions stored in the memory unit as required to process information entered into or stored within the calculator. The calculator also includes a bus system comprising an S-bus 50, a T-bus 52, and an R-bus 54 for transferring information from the memory and I/O control units to the CPU, from the CPU to the memory and I/O control units, and between different portions of the CPU. It further comprises a power supply for supplying DC power to the calculator and peripheral units employed therewith and for issuing a control signal POP when power is supplied to the calculator.

The I/O control unit 44 includes an input-output register 56 (hereinafter referred to as the I/O register), associated I/O gating control circuitry 58, and input-output control logic 60 (hereinafter referred to as the I/O control). I/O register 56 comprises a universal sixteen-bit shift register into which information may be transferred either bit-serially from CPU 48 via T-bus 52 or in parallel from keyboard input unit 12, magnetic card reading and recording unit 14, and peripheral input units 28 such as the marked card reader via twelve input party lines 62. Information may also be transferred from I/O register 56 either bit-serially to CPU 48 via S-bus 50 or in parallel to magnetic card reading and recording unit 14, solid state output display unit 18, output printer unit 20, and peripheral output units 28 such as the X-Y plotter or the typewriter via sixteen output party lines 64.

I/O gating control circuitry 58 includes control circuits for controlling the transfer of information into and out of I/O register 56 in response to selected I/O qualifier control signals from CPU 48 and selected I/O control instructions from I/O control 60. It also includes an interrupt control circuit 65, a peripheral control circuit 66, a magnetic card control circuit 67, a printer control circuit 68, and a display control circuit 69 for variously controlling the input and output units and issuing control signals QFG and EBT to I/O control 60 via two output lines 71 and 72. These last mentioned control circuits variously perform their control functions in response to control signal POP from the power supply, I/O qualifier control signals from CPU 48, I/O control instructions from I/O control 60, and control signals from keyboard input unit 12. Interrupt control circuit 65 initiates the transfer of information into I/O register 56 from keyboard input unit 12 or interrupting peripheral input units 28 such as the marked card reader and issues a qualifier control signal QNR to CPU 48 via output lines 73. Peripheral control circuit 66 enables interface modules 30 plugged into the calculator to respond to information from I/O register 56, control associated peripheral units 28, transfer information to and/or receive information from associated peripheral units 28, and in some cases initiate the transfer of information to I/O register 56 from the interface modules themselves. Magnetic card control circuit 67 enables magnetic card reading and recording unit 14 to respond to information in I/O register 56 and either read information into I/O register 56 from a magnetic card 16 or record information onto a magnetic card 16 from I/O register 56. Printer control circuit 68 and display control circuit 69 enable output display unit 18, and output printer unit 20, respectively, to respond to information from I/O register 56.

When a basic I/O instruction obtained from memory unit 46 is to be executed, CPU 48 transfers control to I/O control 60 by issuing a pair of I/O microinstructions PTR and XTR thereto. In response to these I/O microinstructions from CPU 48, control signal POP from the power supply, control signals QFG and EBT from I/O gating control circuitry 58, and I/O qualifier and clock control signals from CPU 48, I/O control 60 selectively issues one or more I/O control instructions to gating control circuitry 58 as required to execute the basic I/O instruction designated by CPU 48 and issues control signals, TTX, XTR, QRD, and SCB to CPU 48 via output lines 74–77. The I/O qualifier control signals issued to I/O control 60 and gating control circuitry 58 by CPU 48 are derived from the basic I/O instruction to be executed. Those qualifier control signals issued to I/O control 60 designate the specific I/O control instructions to be issued by I/O control 60, while those issued to gating control circuitry 58 designate selected control circuits to be employed in executing the basic I/O instruction.

Memory unit 46 includes a modular random-access read-write memory 78 (hereinafter referred to as the RWM), a modular read-only memory 80 (hereinafter referred to as the ROM), a memory address register 82 (hereinafter referred to as the M-register), a memory access register 84 (hereinafter referred to as the T-register), and control circuitry 85 for these memories and registers. RWM 78 and ROM 80 comprise MOS-type semiconductor memories.

M-register 82 of the memory unit comprises a recirculating sixteen-bit serial shift register into which information may be transferred bit-serially from CPU 48 via T-bus 52 and out of which information may be transferred bit-serially to CPU 48 via S-bus 50. Information shifted into M-register 82 may be employed to address any word in RWM 78 or ROM 80 via fifteen output lines 106.

T-register 84 of the memory unit comprises a recirculating sixteen-bit serial shift register into which information may be transferred either bit-serially from CPU 48 via T-bus 52 or in parallel from any addressed word in RWM 78 and ROM 80 via sixteen parallel input lines 108. Information may be transferred from T-register 84 either bit-serially to CPU 48 via S-bus 50 or in parallel to any addressed word in RWM 78 via sixteen parallel output lines 110. The four least significant bits of information contained in T-register 84 may comprise binary-coded-decimal information and may be transferred from the T-register in parallel to CPU 48 via three parallel output lines 112 taken with S-bus 50.

The control circuitry 85 of the memory unit controls these transfers of information into and out of M-register 82 and T-register 84, controls the addressing and accessing of RWM 78 and ROM 80, and refreshes RWM 78. It performs these functions in response to memory microinstructions, memory clock pulses, and shift clock pulses from CPU 48.

CPU 48 includes a register unit 114, an arithmetic-logic unit 116 (hereinafter referred to as the ALU), a programmable clock 118, and a microprocessor 120. Register unit 114 comprises four recirculating sixteen-bit shift registers 122, 124, 126, and 128 and one four-bit shift register 130. Shift registers 122 and 124 serve as sixteen-bit serial accumulator registers (hereinafter referred to as the A-register and the B-register, respectively) into which information may be transferred bit-serially from ALU 116 via T-bus 52 and out of which information may be transferred bit-serially to ALU 116 via R-bus 54. The four least significant bit positions of A-register 122 also serve as a four-bit parallel accumulator register into which four bits of binary-coded-decimal information may be transferred in parallel from ALU 116 via four parallel input lines 132 and out of which four bits of binary-coded-decimal information may also be transferred in parallel to ALU 116 via three parallel output lines 134 taken with R-bus 54.

Shift register 126 serves as a sixteen-bit system program counter (hereinafter referred to as the P-register) into which information may be transferred bit-serially from ALU 116 via T-bus 52 and out of which information may be transferred bit-serially to ALU 116 via R-bus 54. Information contained in the least significant bit position of P-register 126 may also be transferred as a qualifier control signal QPO to microprocessor 120 via output line 135.

Shift register 128 serves as a sixteen-bit qualifier register (hereinafter referred to as the Q-register) into which information may be transferred bit-serially from ALU 116 via T-bus 52 and out of which information may be transferred bit-serially to ALU 116 via R-bus 54. Information contained in the five least significant bit positions of Q-register 128 is transferred to I/O gating control circuitry 58 as five one-bit I/O qualifier control signals Q00–Q04 via five parallel output lines 136, and information contained in the six next least significant bit positions of the Q-register is transferred to I/O control 60 as six one-bit I/O qualifier control signals Q05–Q10 via six parallel output lines 138. Similarly, information contained in the seven least significant, the ninth and eleventh least significant, and the most significant bit positions of Q-register 128 and information derived from the thirteenth, fourteenth, and fifteenth bit positions of the Q-register may be transferred to microprocessor 120 as eleven one-bit microprocessor qualifier control signals Q00–Q06, Q08, Q10, Q15, and QMR via eleven output lines 140. Information contained in the twelfth through the fifteenth least significant bit positions of Q-register 128 may be transferred to microprocessor 120 as a four-bit primary address code via four parallel output lines 142.

Shift register 130 serves as a four-bit serial extend register (hereinafter referred to as the E-register) into which information may be transferred bit-serially either from ALU 116 via 52 or from the least significant bit position of T-register 84 via input line 144. Information may also be transferred out of E-register 130 to ALU 116 via R-bus 54.

Register unit 114 also includes control circuitry 146 for controlling the transfer of parallel binary-coded-decimal information into and out of A-register 122 and the transfer of serial binary information into and out of A-register 122, B-register 124, P-register 126, Q-register 128, and E-register 130. This is accomplished in response to register microinstructions from microprocessor 120, control signals TTX and XTR from I/O control 60, and shift clock control pulses from programmable clock 118. Control circuitry 146 includes a flip-flop 148 (hereinafter referred to as the A/B flip-flop) for enabling the transfer or information into and out of either the A-register 122 or the B-register 124 as determined by the state of the A/B flip-flop. The state of A/B flip-flop 148 is initially determined by information Q11 transferred to the A/B flip-flop from the twelfth least significant bit position of Q-register 128 but may be subsequently complemented one or more times by microinstruction CAB from microprocessor 120.

ALU 116 may perform either one-bit serial binary arithmetic on data received from T-register 84 or M-register 82 via S-bus 50 and/or from any register of register unit 114 via R-bus 54 or four-bit parallel binary-coded-decimal arithmetic on data received from T-register 84 via output lines 112 taken with S-bus 50 and/or from A-register 122 via output lines 134 taken with R-bus 54. It may also perform logic operations on data received from memory unit 46 and/or register unit 114 via any of these lines. The arithmetic and logic operations performed are designated by ALU microinstructions from microprocessor 120 and are carried out in response to these microinstructions, shift clock control pulses from programmable clock 118, and control signal SCB from I/O control 60. Information is also transferred from ALU 116 to A-register 122 via output lines 132 or to I/O register 56, M-register 82, T-register 84, or any register of register unit 114 via T-bus 52 in response to microinstructions and control signals applied to these registers. If a carry results while ALU 116 is performing either one-bit serial binary arithmetic or four-bit parallel binary-coded-decimal arithmetic, the ALU issues a corresponding qualifier control signal QBC and QDC to microprocessor 120 via one of two output lines 152 and 154.

Programmable clock 118 includes a crystal-controlled system clock 156, a clock decoder and generator 158, and a control gate 160. System clock 156 issues regularly recurring clock pulses to clock decoder and generator 158 via output line 162. In response to these regularly recurring clock pulses from system clock 156 and to four-bit clock codes from microprocessor 120, clock decoder and generator 158 issues trains of $n$ shift clock pulses to ALU 116, M-register 82, T-register 82, and all of the registers of register unit 114 via output line 164. These trains of $n$ shift clock pulses are employed for shifting a corresponding number of bits of serial information into or out of any of these registers or for shifting a carry bit in the ALU. The number $n$ of pulses in each of these trains may vary from one to sixteen as determined by the number of bits of serial information required during each operation to be performed. In response to a control signal CCO from microprocessor 120, control gate 160 prevents any shift clock pulses from being applied to the ALU or any of these registers. Upon completion of each train of $n$ shift clock pulses, clock decoder and generator 158 issues a ROM clock pulse to microprocessor 120 via output line 166 and an I/O clock pulse to I/O control 60 via output line 168. In response to the regularly recurring clock signal from system clock 56, clock decoder and generator 158 also issues correspondingly regularly recurring memory clock pulses to memory unit 46 via output line 170.

Microprocessor 120 selectively issues two I/O microinstructions to I/O control 60 via two output lines 172, six memory microinstructions to memory unit 46 via six output lines 174, thirteen register microinstructions to register unit 114 via thirteen output lines 176, and five ALU microinstructions to ALU 116 via five output lines 178. It also issues a four-bit clock code associated with each of these microinstructions to clock decoder 158 via four output lines 180. These microinstructions and associated clock codes are issued as determined by the control signal POP from the power supply, the eleven microprocessor qualifier control signals from Q-register 128, the four-bit primary address codes from Q-register 128, and the five microprocessor qualifier control signals from I/O control 60, interrupt control 65, ALU 116, and P-register 126.

We claim:
1. An electronic calculator comprising:
    keyboard input means including a plurality of keys for entering lines of one or more alphameric statements each into the calculator;
    buffer storage means, coupled to said keyboard input means, for storing each line of one or more alphameric statements as it is entered into the calculator from said keyboard input means;
    memory means, coupled to said buffer storage means, for storing lines of one or more alphameric statements each entered into the calculator;
    processing means, coupled to said keyboard input means, buffer storage means, and memory means, for selectively processing either a line of one or more alphameric statements entered into the calculator and stored in said buffer storage means or lines of one or more alphameric statements stored in said memory means to perform selected functions; and
    output means, coupled to said buffer storage means and said processing means, for providing an output indication of selected functions performed by the calculator;
    said keyboard input means including an execute control key for initiating execution of a line of one or more alphameric statements by said processing means, and a store control key for initiating storage of a line of one or more alphameric statements in said memory means; and
    said processing means being responsive to actuation of said execute control key, following entry of a line of one or more alphameric statements into said buffer storage means, for executing that line of one or more alphameric statements, and being responsive to actuation of said store control key, following entry of a line of one or more alphameric statements into said buffer storage means, for storing that line of one or more alphameric statements in said memory means.

2. An electronic calculator as in claim 1 wherein:
    said keyboard input means includes recall means for initiating recall of a designated line of one or more alphameric statements from said memory means to said buffer storage means; and
    said processing means is responsive to actuation of said recall means for recalling a designated line of one or more alphameric statements from said memory means to said buffer storage means, said processing means being further responsive to actuation of said execute control key, following recall of a line of one or more alphameric statements to said buffer storage means, for executing that line of one or more alphameric statements, and is responsive to actuation of said store control key, following recall of a line of one or more alphameric statements into said buffer storage means, for storing that line of one or more alphameric statements, into said buffer storage means.

3. An electronic calculator as in claim 1 wherein said output means is operable for visually displaying a line of one or more alphameric statements stored in said buffer storage means.

4. An electronic calculator comprising:

keyboard input means, including a plurality of keys, for entering lines of one or more alphameric statements each into the calculator;

buffer storage means, coupled to said keyboard input means, for storing each line of one or more alphameric statements as it is entered into the calculator from said keyboard input means;

memory means, coupled to said buffer storage means, for storing lines of one or more alphameric statements each entered into the calculator;

processing means, coupled to said keyboard input means, buffer storage means, and memory means, for selectively processing either a line of one or more alphameric statements entered into said buffer storage means or lines of one or more alphameric statements stored in said memory means to perform selected functions; and alphameric output display means, coupled to said buffer storage means and processing means, for visually displaying a line of one or more alphameric statements stored in said buffer storage means to enable the user to check for errors therein during and after entry of that line;

said keyboard input means including an execute control key for initiating execution of a line of one or more alphameric statements by said processing means, and a store control key for initiating storage of a line of one or more alphameric statements in said memory means;

said processing means being coupled to said keyboard input means, buffer storage means, and memory means, being responsive to actuation of said execute control key, following entry of a line of one or more alphameric statements into said buffer storage means, for executing that line of one or more alphameric statements, and being responsive to actuation of said store control key, following entry of a line of one or more alphameric statements into said buffer storage means, for storing that line of one or more alphameric statements in said memory means.

5. An electronic calculator as in claim 4 wherein:

said keyboard input means includes a first control key operable with one or more other keys for designating a particular line of one or more alphameric statements stored in said memory means, and a second control key for initiating nondestructive recall of a designated line of one or more alphameric statements from said memory means to said buffer storage means; and said processing means is responsive to actuation of said second control key, following actuation of said first control key and one or more other keys designating a particular line of one or more alphameric statements stored in said memory means, for nondestructively transferring that line of one or more alphameric statements from said memory means to said buffer storage means to enable the user to observe a display thereof by said alphameric output display means.

6. An electronic calculator as in claim 5 wherein said processing means is responsive to successive actuations of said second control key for transferring successive lines of one or more alphameric statements each from said memory means to said buffer storage means to enable the user to observe a visual display thereof by said alphameric output display means.

7. An electronic calculator as in claim 5 wherein:

a separate line number is associated with each line of one or more alphameric statements stored in said memory means; and said processing means includes an interpreter routine responsive to actuation of said first control key, followed by actuation of one or more other keys representing a particular line number, for computing the current address in said memory means of the line of one or more alphameric statements associated with that line number, and an uncompiler routine responsive to actuation of said second control key for nondestructively transferring the line of one or more alphameric statements specified by that address from said memory means to said buffer storage means.

8. An electronic calculator as in claim 5 wherein said keyboard input means includes a delete control key for deleting from said memory means a line of one or more alphameric statements recalled from said memory means to said buffer storage means.

9. An electronic calculator as in claim 5 wherein said keyboard input means includes an insert control key for inserting one or more lines of one or more alphameric statements each between any two designated lines of one or more alphameric statements stored in said memory means.

10. An electronic calculator as in claim 9 where said processing means includes an insert routine responsive to actuation of said insert control key, following recall of a line of one or more alphameric statements from said memory means to said buffer storage means, for inserting one or more lines of one or more alphameric statements each into said memory means immediately following that recalled line.

11. An electronic calculator as in claim 5 wherein:

said keyboard input means includes a plurality of editing keys for initiating editing of a line of one or more alphameric statements, entered into said buffer storage means from said keyboard input means or recalled thereto from said memory means, without altering the contents of said memory means; and said processing means is responsive to selected actuation of said plurality of editing keys for performing one or more designated editing functions, said processing means being further responsive to actuation of said store control key, following editing of a line of one or more alphameric statements stored in said buffer storage means, for storing that edited line in said memory means.

12. An electronic calculator as in claim 11 wherein said processing means is responsive to actuation of said store control key, following editing of a line of one or more alphameric statements recalled to said buffer storage means from said memory means, for storing that edited recalled line back into said memory means in place of the corresponding unedited line previously stored therein.

13. An electronic calculator as in claim 11 wherein:

said editing keys include a forward control key and a backward control key for initiating single stepping either forward or backward through a line of one or more alphameric statements entered into said buffer storage means from said keyboard input means or recalled from said memory means; and said processing means is responsive to actuation of either of said forward and backward control keys for enabling said alphameric output display means to visually display part or all of the entered or recalled line of one or more alphameric statements up to and including as the last displayed character the last character to which that line has been single stepped.

14. An electronic calculator as in claim 13 wherein said buffer storage means includes a register pointer, said processing means being responsive to actuation of either said forward control key or said backward control key for single stepping said register pointer either forward or backward, respectively, through a line of one or more alphameric statements stored in said buffer storage means and for designating the last character of that line to be displayed by said alphameric output display means.

15. An electronic calculator as in claim 13 wherein said processing means includes routines responsive to successive actuations of said forward and backward control keys for single stepping character-by-character through a line of one or more alphameric statements recalled to said buffer storage means from said memory means and, upon reaching one end of that recalled line, for recalling the next succeeding or preceding line of one or more alphameric statements stored in said memory means to said buffer storage means.

16. An electronic calculator as in claim 13 wherein said processing means includes a replacement routine for conditioning the calculator to allow replacement of one or more characters of a line of one or more alphameric statements, entered into said buffer storage means from said keyboard input means or recalled from said memory means, by actuating keys of said keyboard input means that are representative of the desired one or more replacement characters, following actuation of at least one of said forward and backward control keys for single stepping to the desired one or more characters to be replaced.

17. An electronic calculator as in claim 13 wherein said editing keys include a delete control key for selectively deleting one or more characters of a line of one or more alphameric statements, entered into said buffer storage means from said keyboard input means or recalled thereto from said memory means, following actuation of at least one of said forward and backward control keys for single stepping to the one or more characters to be deleted.

18. An electronic calculator as in claim 17 wherein said processing means includes a delete routine responsive to actuation of said delete control key, following actuation of at least one of said foward and backward control keys for single stepping to a particular character of a displayed line of one or more alphameric statements, for deleting that character.

19. An electronic calculator as in claim 13 wherein said editing keys include an insert control key for inserting one or more characters at selected positions within a line of one or more alphameric statements, entered into said buffer storage means from said keyboard input means or recalled thereto from said memory means, following actuation of at least one of said forward and backward control keys for single stepping to the selected position.

20. An electronic calculator as in claim 19 wherein said processing means includes an insert routine responsive to actuation of said insert control key, following actuation of at least one of said forward and backward control keys for single stepping to a particular position of a displayed line of one or more alphameric statements, for inserting one or more additional characters.

* * * * *

UNITED STATES PATENT AND TRADEMARK OFFICE
CERTIFICATE OF CORRECTION

PATENT NO. : 4,028,538
DATED : June 7, 1977
INVENTOR(S) : Emil Edward Olander, Jr., et al.

It is certified that error appears in the above-identified patent and that said Letters Patent are hereby corrected as shown below:

Column 3, line 36, "operator housekeeping requirements" should read --operator "housekeeping" requirements--;

Column 4, line 39, should read -- calculator.
These objects are accomplished according to the illustrated preferred embodiment of this invention by employing a keyboard input unit, a magnetic card reading and recording unit, a solid state output display unit, an output printer unit, an input-output control unit, a memory unit, and a central --.

Figure 3A:
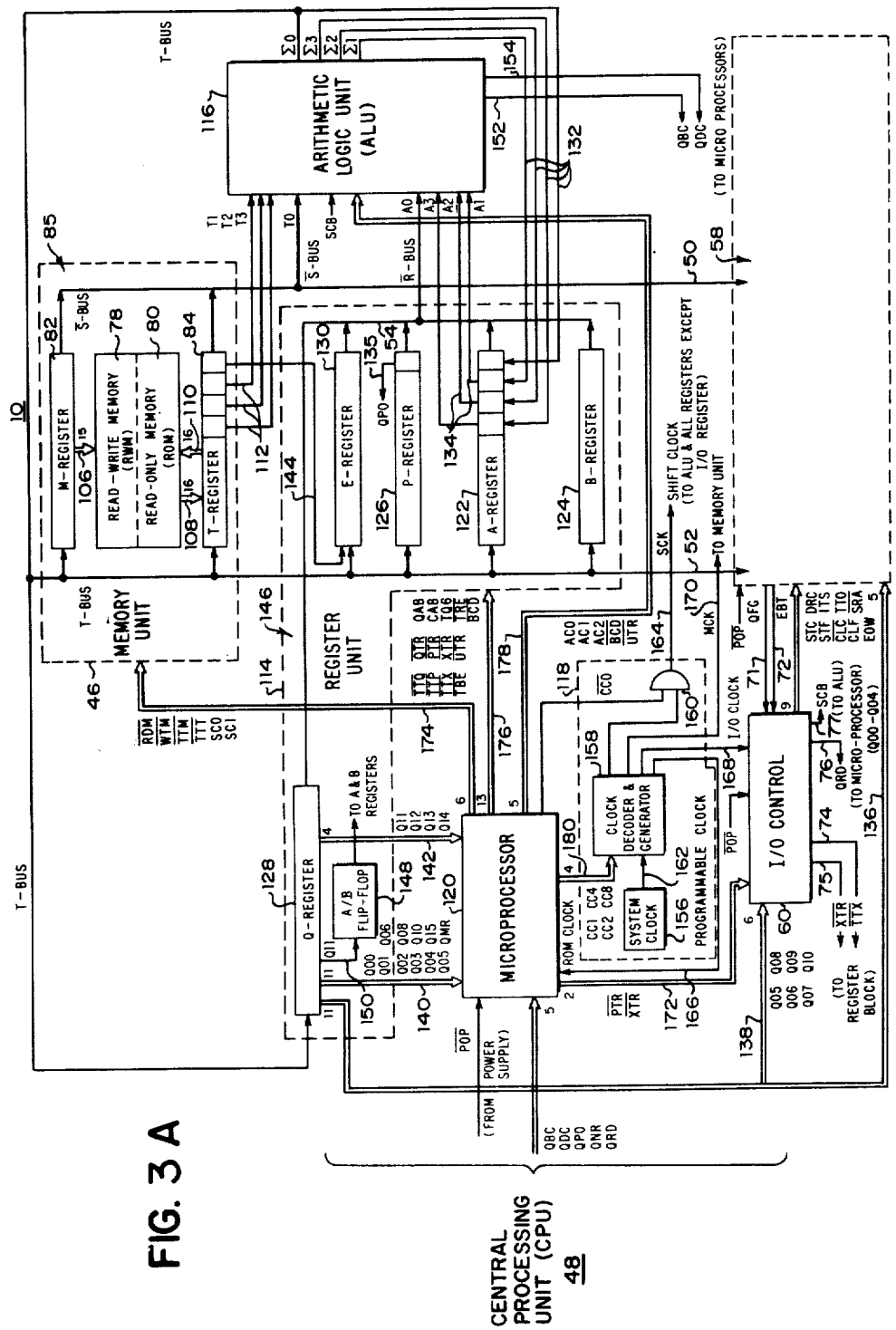
Figure 3B:
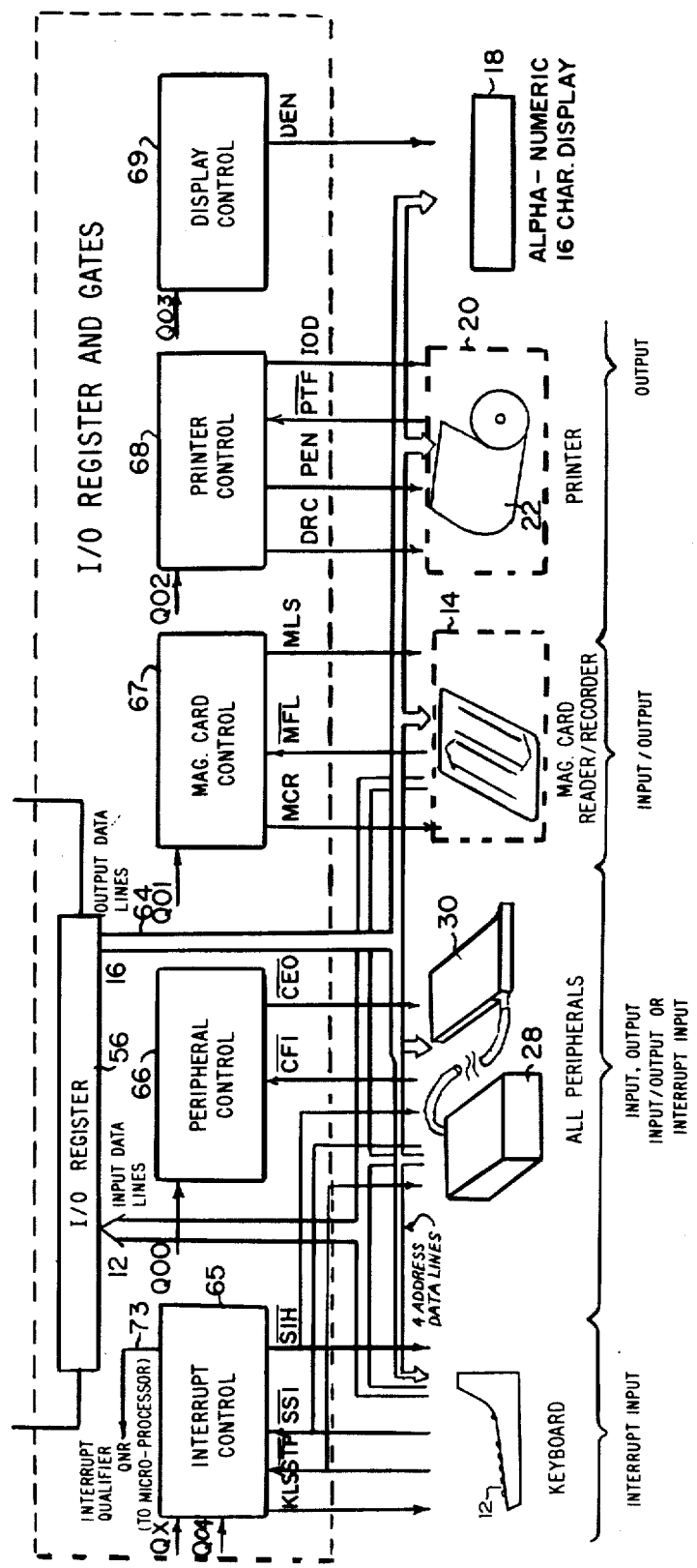
Figure 7:
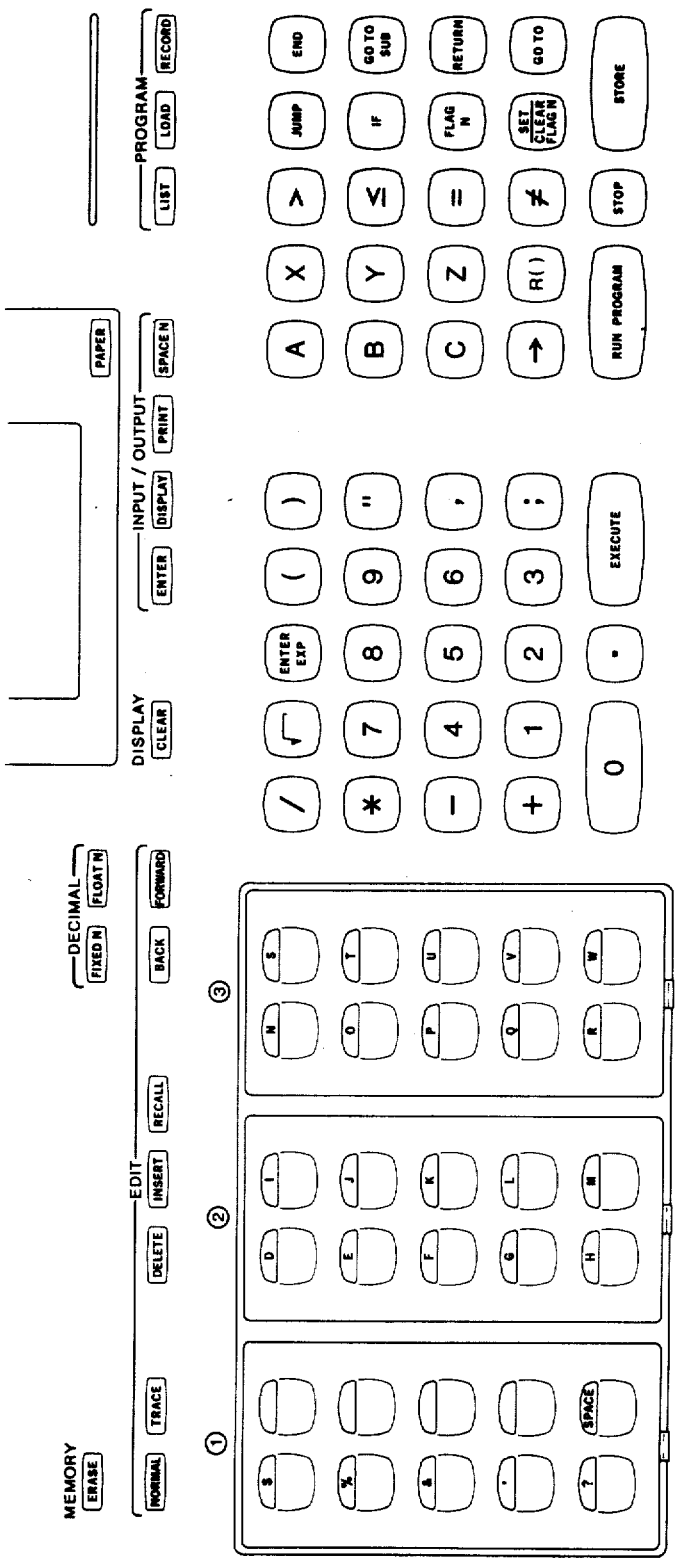
FIG. 7 is a plan view of the keyboard input unit employed in the adaptable programmable calculator of FIG. 1.

Column 7, line 36, "FIGS. 2A-B" should read --FIGS. 3A-B--;

Column 8, line 8, "S-bus 50" should read --$\overline{S}$-bus 50--;

Column 8, line 8, "R-bus 54" should read --$\overline{R}$-bus 54--;

Column 8, line 15, "POP" should read --$\overline{POP}$--;

Column 8, line 29, "S-bus 50" should read --$\overline{S}$-bus 50--;

Column 8, line 46, "POP" should read --$\overline{POP}$--;

Column 9, line 6, "PTR and XTR" should read --$\overline{PTR}$ and $\overline{XTR}$--;

Column 9, line 7, "POP" should read --$\overline{POP}$--;

Column 9, line 14, "TTX, XTR," should read --$\overline{TTX}$, $\overline{XTR}$,--;

Column 9, line 37, "S-bus 50" should read --$\overline{S}$-bus 50--;

UNITED STATES PATENT AND TRADEMARK OFFICE
CERTIFICATE OF CORRECTION

PATENT NO. : 4,028,538

DATED : June 7, 1977

INVENTOR(S) : Emil Edward Olander, Jr., et al.

It is certified that error appears in the above-identified patent and that said Letters Patent are hereby corrected as shown below:

Column 9, line 47, "S-bus 50" should read --$\overline{S}$-bus 50--;

Column 9, line 53, "S-bus 50" should read --$\overline{S}$-bus 50--;

Column 10, line 4, "R-bus 54" should read --$\overline{R}$-bus 54--;

Column 10, line 11, "R-bus 54" should read --$\overline{R}$-bus 54--;

Column 10, line 17, "R-bus 54" should read --$\overline{R}$-bus 54--;

Column 10, line 25, "R-bus 54" should read --$\overline{R}$-bus 54--;

Column 10, line 49, "via 52" should read --via T-bus 52--;

Column 10, line 52, "R-bus 54" should read --$\overline{R}$-bus 54--;

Column 10, line 60, "TTX and XTR" should read --$\overline{TTX}$ and $\overline{XTR}$--;

Column 11, line 7, "S-bus 50" should read --$\overline{S}$-bus 50--;

Column 11, line 8, "R-bus 54" should read --$\overline{R}$-bus 54--;

UNITED STATES PATENT AND TRADEMARK OFFICE
CERTIFICATE OF CORRECTION

PATENT NO. : 4,028,538

DATED : June 7, 1977

INVENTOR(S) : Emil Edward Olander, Jr., et al.

It is certified that error appears in the above-identified patent and that said Letters Patent are hereby corrected as shown below:

Column 11, line 10, "S-bus 50" should read --$\overline{S}$-bus 50--;

Column 11, line 12, "R-bus 54" should read --$\overline{R}$-bus 54--;

Column 11, line 48, "CCO" should read --$\overline{CCO}$--; and

Column 12, line 1, "POP" should read --$\overline{POP}$--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks